US012231074B2

United States Patent
Yang et al.

(10) Patent No.: US 12,231,074 B2
(45) Date of Patent: Feb. 18, 2025

(54) CONTROL METHOD AND CONTROL APPARATUS FOR VOLTAGE SOURCE-TYPE WIND TURBINE

(71) Applicant: BEIJING GOLDWIND SCIENCE & CREATION WINDPOWER EQUIPMENT CO., LTD., Beijing (CN)

(72) Inventors: Zhiqian Yang, Beijing (CN); Xiao Yu, Beijing (CN); Rui Guo, Beijing (CN); Mingjie Tang, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days.

(21) Appl. No.: 18/294,284

(22) PCT Filed: Dec. 8, 2021

(86) PCT No.: PCT/CN2021/136329
§ 371 (c)(1),
(2) Date: Feb. 1, 2024

(87) PCT Pub. No.: WO2023/019817
PCT Pub. Date: Feb. 23, 2023

(65) Prior Publication Data
US 2024/0429841 A1 Dec. 26, 2024

(30) Foreign Application Priority Data
Aug. 20, 2021 (CN) .......................... 202110961460.0

(51) Int. Cl.
*H02P 9/02* (2006.01)
*H02P 9/04* (2006.01)

(52) U.S. Cl.
CPC . *H02P 9/02* (2013.01); *H02P 9/04* (2013.01)

(58) Field of Classification Search
CPC .................................. H02P 9/02; H02P 9/04
See application file for complete search history.

(56) References Cited

U.S. PATENT DOCUMENTS

| 7,423,406 B2 | 9/2008 | Geniusz |
| 8,198,742 B2 * | 6/2012 | Jorgensen ............... F03D 7/044 290/44 |

(Continued)

FOREIGN PATENT DOCUMENTS

| CN | 109088439 A | 12/2018 |
| CN | 109842157 A | 6/2019 |

(Continued)

OTHER PUBLICATIONS

The International Search Report mailed May 18, 2022; PCT/CN2021/136329.

(Continued)

*Primary Examiner* — Pedro J Cuevas

(57) ABSTRACT

The present disclosure provides a control method and control apparatus for a voltage source-type wind turbine. The control method comprises: performing a proportional-integral-derivative operation on a deviation between a DC bus voltage measurement value and DC bus voltage reference value of a wind turbine to obtain an active power deviation; determining a virtual angular frequency deviation on the basis of the active power deviation; determining a virtual internal potential phase on the basis of the virtual angular frequency deviation; obtaining a d-axis virtual impedance output and an q-axis virtual impedance output by means of inputting a grid-connected current in a dq coordinate system to a virtual impedance module; on the basis of the virtual angular frequency deviation, a reactive power setting value and reactive power measurement value of the wind turbine, (Continued)

a rated voltage amplitude of a grid, the d-axis virtual impedance output and the q-axis virtual impedance output, determining a d-axis component and q-axis component of a modulation voltage; and controlling an injection voltage of a grid-connected point of the wind turbine according to the virtual internal potential phase and the d-axis component and q-axis component of the modulation voltage.

20 Claims, 5 Drawing Sheets

(56) References Cited

U.S. PATENT DOCUMENTS

| | | | | |
|---|---|---|---|---|
| 8,710,689 | B2* | 4/2014 | Letas | H02J 3/381 |
| | | | | 290/55 |
| 11,715,958 | B2* | 8/2023 | Howard | H02J 3/46 |
| | | | | 363/71 |
| 12,078,151 | B2* | 9/2024 | Barton | F03D 7/0272 |
| 2003/0151259 | A1* | 8/2003 | Feddersen | F03D 9/255 |
| | | | | 290/44 |
| 2004/0066177 | A1* | 4/2004 | Gupta | F02C 7/275 |
| | | | | 290/53 |
| 2008/0084643 | A1* | 4/2008 | Flottemesch | H02J 3/34 |
| | | | | 361/93.2 |
| 2011/0031762 | A1* | 2/2011 | Letas | H02J 3/381 |
| | | | | 290/55 |
| 2022/0294229 | A1* | 9/2022 | Runge | F03D 7/048 |
| 2023/0031575 | A1* | 2/2023 | Howard | H02J 3/381 |
| 2023/0411965 | A1* | 12/2023 | Hart | H02J 3/381 |
| 2024/0136823 | A1* | 4/2024 | Tamimi | H02J 3/241 |

FOREIGN PATENT DOCUMENTS

| | | |
|---|---|---|
| CN | 109980682 A | 7/2019 |
| CN | 110148952 A | 8/2019 |
| CN | 110198055 A | 9/2019 |
| CN | 110429655 A | 11/2019 |
| CN | 112217235 A | 1/2021 |
| WO | 2019/035760 A1 | 2/2019 |

OTHER PUBLICATIONS

The extended European Search Report dated Oct. 10, 2024; Appln. No. 21954052.3.

* cited by examiner

CONTROL METHOD AND CONTROL APPARATUS FOR VOLTAGE SOURCE-TYPE WIND TURBINE

CROSS-REFERENCE TO RELATED APPLICATIONS

This application is a National Stage of International Application No. PCT/CN2021/136329, filed 8 Dec. 2021, which claims priority to and the benefit of Chinese Patent Application No. 202110961460.0, filed 20 Aug. 2021 the entireties of which are hereby incorporated herein by reference.

FIELD

The present disclosure relates to the field of wind power generation, and more particularly, to a method and apparatus for controlling a voltage source type wind turbine.

BACKGROUND

Wind power generation technology is developing rapidly, and a penetration rate of the wind power generation technology in grid applications is increasing. Control of a voltage source wind turbine needs to take many factors, such as grid stability and coupling between active power and reactive power, into consideration. How to achieve effective control on the point of common coupling of the wind turbine is a problem to be solved.

SUMMARY

An objective of embodiments of the present disclosure is to provide a method and apparatus for controlling a voltage source type wind turbine, with which an injection voltage of a point of common coupling of the wind turbine is controlled, so that grid stability and coupling between active power and reactive power can be improved.

A method for controlling a voltage source type wind turbine is provided according to an embodiment of the present disclosure. The method includes: obtaining an active power deviation through a proportional integral differential operation on a deviation between a measured direct current (DC) bus voltage and a reference DC bus voltage of the wind turbine; determining a virtual angular frequency deviation based on the active power deviation; determining a virtual inner potential phase based on the virtual angular frequency deviation; inputting a grid-connected current in a dq coordinate system into a virtual impedance module to obtain a d-axis virtual impedance output and a q-axis virtual impedance output; determining a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output; and controlling an injection voltage at a point of common coupling of the wind turbine, based on the virtual inner potential phase, the d-axis component of the modulated voltage, and the q-axis component of the modulated voltage.

An apparatus for controlling a voltage source type wind turbine is provided according to an embodiment of the present disclosure. The apparatus includes: an active power deviation obtaining unit, configured to obtain an active power deviation through a proportional integral differential operation on a deviation between a measured DC bus voltage and a reference DC bus voltage of the wind turbine; a virtual angular frequency deviation determination unit, configured to determine a virtual angular frequency deviation based on the active power deviation; a virtual inner potential phase determination unit, configured to determine a virtual inner potential phase based on the virtual angular frequency deviation; a virtual impedance processing unit, configured to input a grid-connected current in a dq coordinate system into a virtual impedance module to obtain a d-axis virtual impedance output and a q-axis virtual impedance output; a modulated voltage obtaining unit, configured to determine a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output; and a voltage control unit, configured to control an injection voltage at a point of common coupling of the wind turbine, based on the virtual inner potential phase, the d-axis component of the modulated voltage, and the q-axis component of the modulated voltage.

A computer-readable storage medium storing a computer program is provided according to an embodiment of the present disclosure. The computer program, when executed by a processor, performs the above-described method for controlling a voltage source type wind turbine.

A computing device is provided according to an embodiment of the present disclosure. The computing device includes: a processor; and a memory storing a computer program, where the computer program, when executed by the processor, performs the above-described method for controlling a voltage source type wind turbine.

With the method and apparatus for controlling a voltage source type wind turbine, the computer-readable storage medium, and the computing device according to the embodiments of the present disclosure, one of the following technical effects can be achieved. Various factors, such as the grid stability and the coupling between active power and reactive power are comprehensively considered. The injection voltage at the point of common coupling of the wind turbine is controlled during a dynamic change of a DC bus voltage. Thus, the grid stability and the coupling between active power and reactive power can be improved. For example, the injection voltage at the point of common coupling of the voltage source type wind turbine can be controlled stably and effectively, a damping of the whole system is appropriately improved, and a degree of coupling between active power and reactive power is appropriately reduced. With the proportional integral differential operation on the deviation between a measured DC bus voltage and a reference DC bus voltage of the wind turbine, a frequency adaptability, a parameter robustness and a deviation suppression speed of the wind turbine are improved. By introducing a simulated power system stabilizer (PSS) in the reactive voltage droop control, the power system stability of the wind turbine is improved.

BRIEF DESCRIPTION OF THE DRAWINGS

The above and other objectives and features of the present disclosure will become more apparent from the following description in conjunction with the accompanying drawings.

It should be noted that the same reference signs throughout the drawings refer to the same or similar elements, features, and structures.

DETAILED DESCRIPTION

Figure 1:
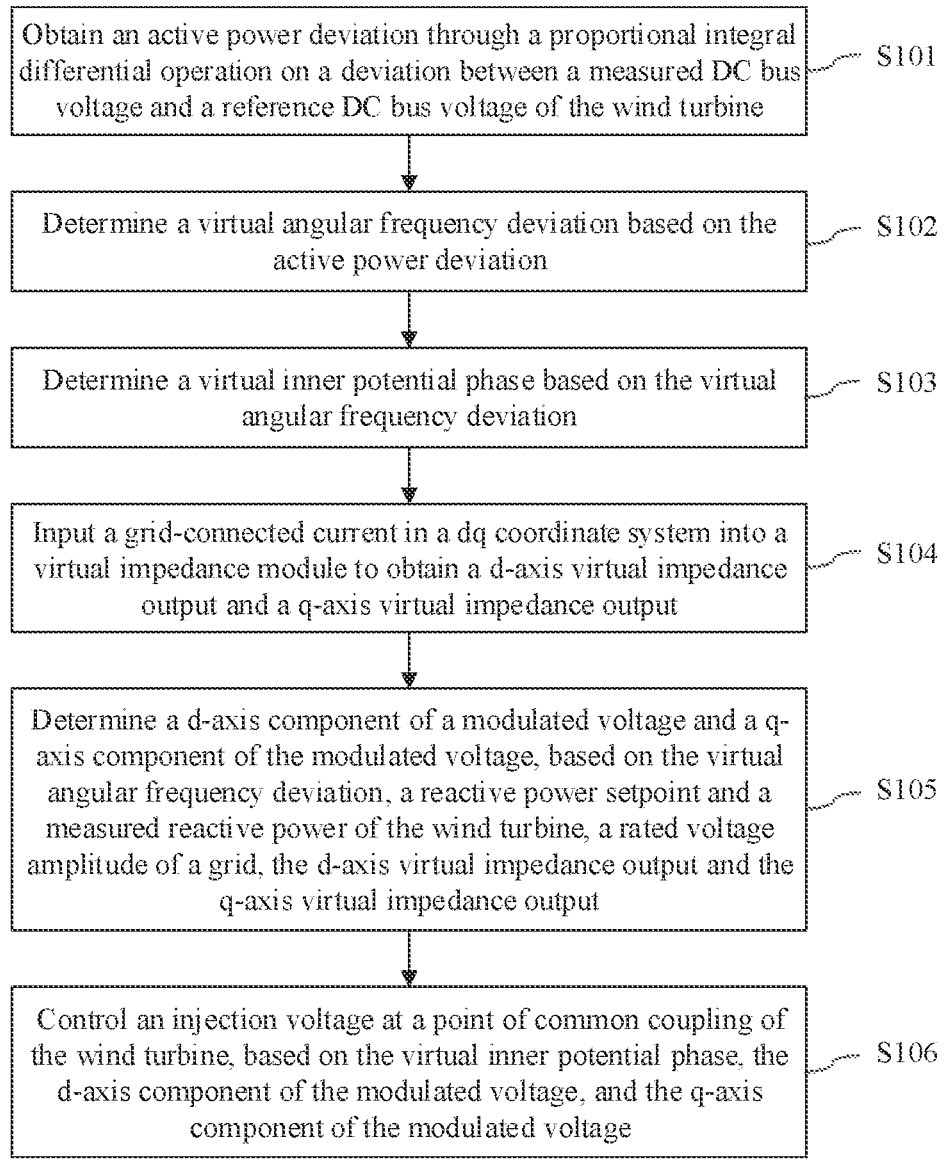
FIG. 1 is a flow chart of a method for controlling a voltage source type wind turbine according to an embodiment of the present disclosure.

In order to facilitate understanding of the technical concept of the present disclosure, relevant terms, a relationship between a system frequency and a DC bus voltage, and the like, are explained and described as follows.

A power angle refers to a difference between a phase angle of an output voltage of a converter of a wind turbine and a phase angle of a grid voltage. In a case that the phase angle of the output voltage of the converter leads the phase angle of the grid voltage, that is, the power angle is greater than 0, an active power is provided from the converter to an alternating current (AC) system. Conversely, in a case that the phase angle of the output voltage of the converter lags behind the phase angle of the grid voltage, that is, the power angle is less than 0, the active power is provided from the AC system to the converter. In a case that a frequency of the output voltage of the converter is consistent with a system frequency, the power angle remains unchanged. Moreover, in a stable state, the phase angle of the output voltage of the converter leads the phase angle of the grid voltage, that is, the power angle is greater than 0, and the active power is provided from the converter to the AC system.

Based on the above, the following rule can be obtained: as the system frequency increases, the power angle decreases, and the active power transmitted between the converter and the AC system decreases. A DC voltage deviation is calculated by subtracting a setpoint from a feedback value. Hence, in order to maintain a DC bus voltage unchanged, the converter actively increases the DC bus voltage, which increases an output frequency of the converter based on a rotor motion equation. The frequency is further subjected to an integration process, so that the phase angle of the output voltage of the converter is increased. As a result, the power angle between the converter and the AC system is increased. Thereby, the power angle is restored to an original stable value, and the active power transmitted between the converter and the AC system is maintained. The above process may be intuitively understood from another perspective. In order to maintain synchronization with the grid voltage (that is, having a same frequency as the grid voltage), the converter increases its own output angular frequency to maintain the power angle unchanged. The angular frequency is determined by subjecting the DC voltage deviation to a first-order low-pass filter, and therefore the DC bus voltage increases. As the system frequency decreases, the power angle increases, and the active power transmitted between the converter and the AC system increases. In order to maintain synchronization with the AC system, the converter reduces a frequency of the output voltage, and therefore the DC bus voltage droops.

A method and apparatus for controlling a voltage source type wind turbine are provided in the present disclosure. With the method and apparatus, in a control system of the voltage source type wind turbine, an injection voltage at a point of common coupling of the wind turbine is controlled dynamically based on a DC bus voltage. By controlling the injection voltage at the point of common coupling of the wind turbine, grid stability and coupling between active power and reactive power are improved.

Specific embodiments are described below in conjunction with the accompanying drawings to help a reader to gain a comprehensive understanding of the method, apparatus and/or systems described herein. After understanding the present disclosure, various changes, modifications, and equivalents of the method, apparatus, and/or system described herein would be clear. For example, an order of operations described herein is only an example and is not limited to those described here. The order of operations may be changed as would be clear after understanding the present disclosure, except for operations that must occur in a specific order. In addition, description of features known in the art may be omitted, for clarity and conciseness.

The features described herein may be implemented in different forms and should not be limited to the examples described here. The examples described here are provided to illustrate only some of feasible ways of implementing the method, apparatus, and/or system described here, many other feasible ways would be clear after understanding the present disclosure.

As used herein, terms "and/or" includes any one of listed items associated with the term, and any combination of any two or more of the items.

Although terms "first," "second," "third" and the like may be used herein to describe various components, elements, regions, layers, or parts, these components, elements, regions, layers, or parts should not be limited by these terms. On the contrary, these terms are only used to distinguish one component, element, region, layer, or part from another component, component, region, layer, or part. Therefore, without departing from the teachings of the examples, a first component, first element, first region, first layer, or first part referred to in the examples described herein may be referred to as a second component, second element, second region, second layer, or second part.

The terms used herein are only for describing various examples and are not intended to limit the present disclosure. Unless clearly indicated in the context otherwise, a singular form is intended to include a plural form. Terms "include", "comprise", and "have" indicate existence of a mentioned feature, quantity, operation, component, element, and/or combination thereof, but do not exclude existence or addition of one or more other features, quantities, operations, components, elements, and/or combinations thereof.

Unless otherwise defined, all terms used herein (including technical terms and scientific terms) have the same meanings as those commonly understood by ordinary technical personnel in the field to which the present disclosure belongs after understanding the present disclosure. Unless explicitly defined otherwise, terms (such as those defined in a general dictionary) should be interpreted as having meanings consistent with their respective contexts in the relevant field and in the present disclosure, and should not be interpreted ideally or too formalistically.

In addition, in the description of the examples, detail description of well-known relevant structures or functions are omitted, when it is believed that the detailed description may cause ambiguity to the present disclosure.

Figure 2:
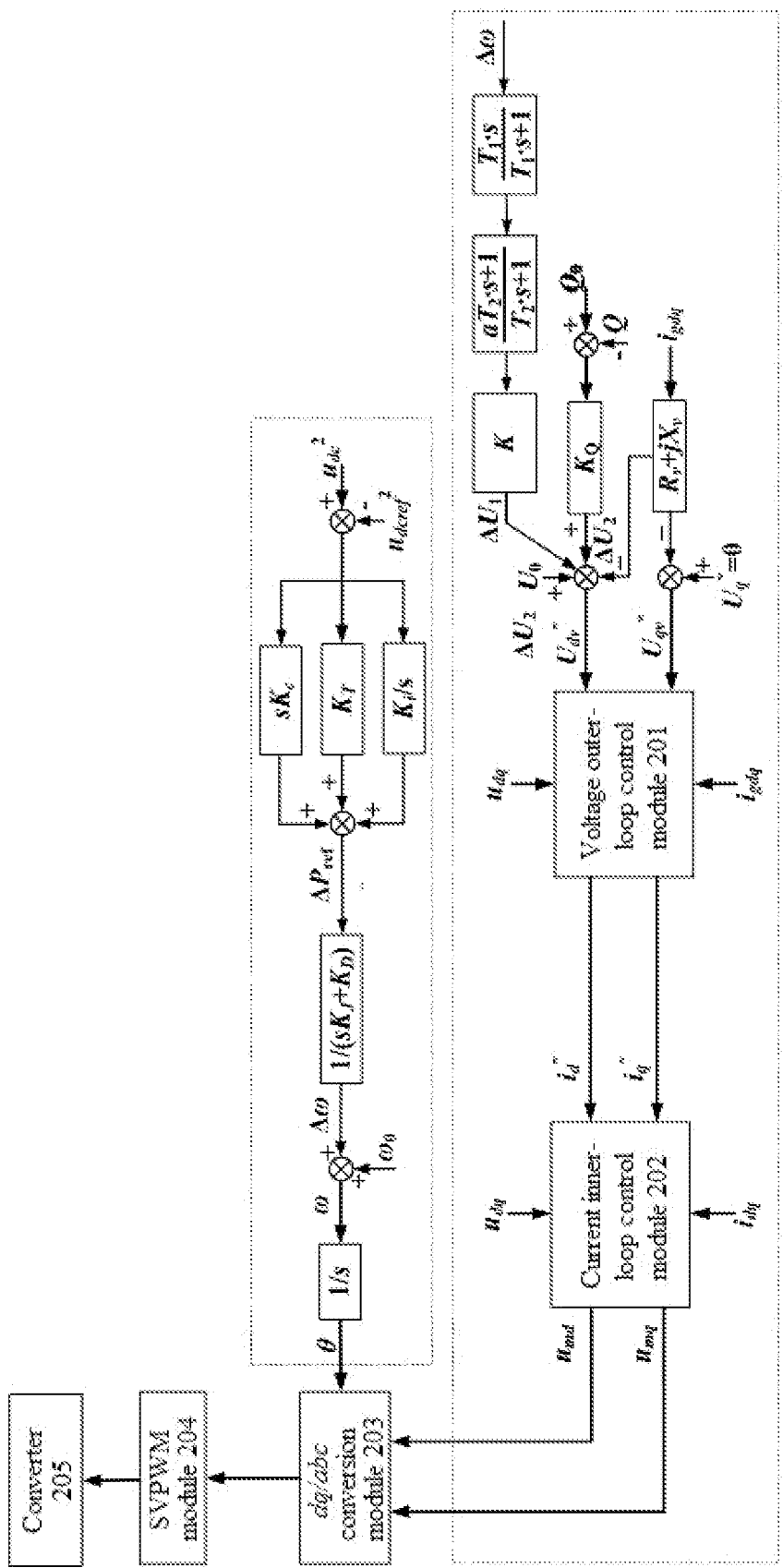
FIG. 2 is a schematic block diagram of a method for controlling a voltage source type wind turbine according to an embodiment of the present disclosure.

FIG. 1 is a flow chart of a method for controlling a voltage source type wind turbine according to an embodiment of the present disclosure. FIG. 2 is a schematic block diagram of a method for controlling a voltage source type wind turbine according to an embodiment of the present disclosure.

Reference is made to FIG. 1. In step S101, an active power deviation is obtained through a proportional integral differential operation on a deviation between a measured DC bus voltage and a reference DC bus voltage of the wind turbine.

According to an embodiment of the present disclosure, the deviation between the measured DC bus voltage and the reference DC bus voltage of the wind turbine may be a difference or squared difference between the measured DC bus voltage and the reference DC bus voltage. The present disclosure is not limited thereto and other forms of deviation are possible.

In an embodiment as shown in FIG. 2, a squared difference (i.e., $u_{dc}^2 - u_{dref}^2$) between a measured DC bus voltage $u_{dc}$ and a reference DC bus voltage $u_{dref}$ is described as an example, but the disclosure is not limited thereto.

Reference is made to FIG. 2. An active power deviation $\Delta P_{ref}$ is obtained through a proportional integral differential (PID) operation on the squared difference between the measured DC bus voltage $u_{dc}$ and the reference DC bus voltage $u_{dref}$.

In a DC bus voltage control loop (which may be referred to as a self-synchronous loop), the squared difference between the measured DC bus voltage (which may be referred to as a feedback DC bus voltage) and the reference DC bus voltage is determined as an input to a PID controller, for the PID controller to perform the PID operation.

In an integral operation stage ($K_i/s$, where Ki represents an integral gain), an integral operation is performed on the deviation between the measured DC bus voltage and the reference DC bus voltage in order to solve a problem of frequency adaptability. In a case that the grid deviates from a rated frequency of the grid (for example, 50 Hz), according to the relationship between system frequency and DC bus voltage described above, an actual DC bus voltage deviates from the reference DC bus voltage. Through the integration on the deviation between the measured DC bus voltage and the reference DC bus voltage, a DC amount is introduced into an angular frequency deviation $\Delta \omega$. Thereby, an error caused by a rated angular frequency $\omega_0$ of the grid is offset. It can be seen that the integration stage is very important.

In a differential operation stage ($sK_c$, where $K_c$ represents a differential gain), a differential operation is performed on the deviation between the measured DC bus voltage and the reference DC bus voltage in order to solve a problem of poor parameter robustness. Energy stored on a DC bus capacitor (for example, $0.5\ CU^2$, where C represents a DC bus capacitance and U represents a voltage across the DC bus capacitor) reflects accumulation of the active power deviation between a machine side and a grid side. A differential value obtained from a differentiation on the energy stored on the DC bus capacitor directly reflects the active power deviation between the machine side and the grid side. With analogy to a synchronous machine, in a case that the active power on the machine side is regarded as a mechanical power and the active power on the grid side is regarded as an electromagnetic power, applying the active power deviation between the grid side and the machine side to a rotor having a damping winding is equivalent to subjecting the active power deviation to a first-order low-pass filter $1/(sK_J + K_D)$, where $K_J$ represents a virtual inertia coefficient and $K_D$ represents a virtual damping coefficient. It can be seen that the differential stage has a clear physical meaning and is very important.

In a proportional operation stage ($K_T$, where $K_T$ represents a proportional gain), a proportional operation is performed on the deviation between the measured DC bus voltage and the reference DC bus voltage in order to reduce a response time of a dynamic process, quickly suppress a change in an initial stage of frequency change, and make up for a slow response of the integral operation stage, which also can assist in the differential operation stage.

In step S102, a virtual angular frequency deviation is determined based on the active power deviation. For example, as shown in FIG. 2, the active power deviation $\Delta P_{ref}$ is inputted into the first-order low-pass filter to obtain an output of the first-order low-pass filter as the virtual angular frequency deviation $\Delta \omega$. For example, but not limited to, the first-order low-pass filter may be constructed based on a function $1/(sK_J + K_D)$, to process the active power deviation $\Delta P_{ref}$, and thereby generate the virtual angular frequency deviation $\Delta \omega$.

The present disclosure is not limited to the embodiment shown in FIG. 2. For example, a sum of the active power deviation and a machine-side active power may be inputted into the first-order low-pass filter to obtain an output of the first-order low-pass filter as the virtual angular frequency deviation. Alternatively, a difference between the active power deviation and a grid-side active power may be inputted into the first-order low-pass filter to obtain an output of the first-order low-pass filter as the virtual angular frequency deviation. In this way, an overall control speed can be increased and an overall dynamic performance can be improved through a feedforward control.

In step S103, a virtual inner potential phase is determined based on the virtual angular frequency deviation. For example, as shown in FIG. 2, a virtual angular frequency $\omega$ is determined based on the virtual angular frequency deviation $\Delta \omega$ and the rated angular frequency $\omega_0$ of the grid. The virtual inner potential phase $\theta$ may be determined based on the virtual angular frequency. In the embodiment as shown in FIG. 2, the virtual angular frequency $\omega$ is determined by summing the virtual angular frequency deviation $\Delta \omega$ and the rated angular frequency $\omega_0$ of the grid. Then, the virtual inner potential phase $\theta$ is obtained through integration on the virtual angular frequency $\omega$.

In step S104, a grid-connected current in a dq coordinate system is inputted into a virtual impedance module to obtain a d-axis virtual impedance output and a q-axis virtual impedance output.

Reference is made to FIG. 2. In an exemplary embodiment of the present disclosure, a virtual impedance may be expressed as $R_v + jX_v$, where $R_v$ represents a virtual resistance and $X_v$ represents a virtual reactance. The grid-connected current in the dq coordinate system is inputted into the virtual impedance module. The virtual impedance module multiplies the grid-connected current $i_{gdq}$ in the dq coordinate system by the virtual impedance, so as to obtain the d-axis virtual impedance output and the q-axis virtual impedance output. By applying the virtual impedance, a damping of the entire control system can be improved, and a strength of the grid can be equivalently reduced. The increase in the virtual impedance may increase the degree of coupling between active power and reactive power, that is, the reactive power changes as the active power changes, and vice versa. Therefore, the virtual impedance needs to be set and adjusted appropriately.

In step S105, a d-axis component of a modulated voltage and a q-axis component of the modulated voltage are determined based on the virtual angular frequency deviation, a reactive power setpoint and a measured reactive power of the wind turbine, a rated voltage amplitude of a grid, the d-axis virtual impedance output and the q-axis virtual impedance output.

According to an exemplary embodiment of the present disclosure, a first disturbance quantity of an AC bus voltage may be first determined based on the virtual angular frequency deviation, and a deviation between the reactive power setpoint and the measured reactive power may be multiplied by a reactive droop coefficient, so as to determine a second disturbance quantity of the AC bus voltage. Then, a d-axis component of a grid-connected reference voltage in the dq coordinate system may be determined based on the first disturbance quantity of the AC bus voltage, the second disturbance quantity of the AC bus voltage, the rated voltage amplitude of the grid, and the d-axis virtual impedance output; and a q-axis component of the grid-connected reference voltage in the dq coordinate system may be determined based on the q-axis virtual impedance output. Finally, the d-axis component of and the q-axis component of the modulated voltage may be determined based on the d-axis component and the q-axis component of the grid-connected reference voltage in the dq coordinate system.

Reference is made to FIG. 2. The first disturbance quantity of the AC bus voltage may be determined by performing, on the virtual angular frequency deviation, at least one of a reset processing, an amplification processing or a phase compensation processing. In an implementation, a control loop of the simulated PSS may be introduced to determine the first disturbance quantity of the AC bus voltage, thereby solving a problem of low-frequency oscillation.

Figure 3:
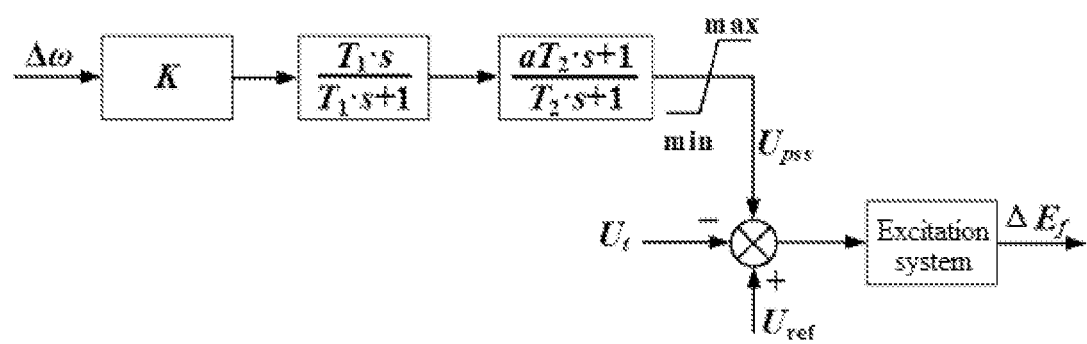
FIG. 3 is a schematic structural diagram of a simulated PSS according to an embodiment of the present disclosure.

In an implementation, the PSS used in a power system generally includes an amplification stage, a reset stage, a phase compensation (correction) stage, and an amplitude limiting stage. An output of the PSS stabilizer is superimposed, as an additional excitation signal, on a reference voltage, as shown in FIG. 3. FIG. 3 is a schematic structural diagram of a simulated PSS according to an embodiment of the present disclosure.

With reference to FIG. 3, K represents the amplification stage of the PSS, $$\frac{T_1 \cdot s}{T_1 \cdot s + 1}$$

represents the reset stage of the PSS, $$\frac{aT_2 \cdot s + 1}{T_2 \cdot s + 1}$$

represents the phase compensation stage of the PSS, and max-min represents the amplitude limiting stage of the PSS. Parameters in the stages may be set differently based on an actual situation.

According to an embodiment of the present disclosure, an output of the PSS is zero in the reset stage in a case of t→∞(s→0), that is, a DC component in Δω is filtered out. During a transition process, the reset stage allows a dynamic signal to pass smoothly, so that the PSS plays a role only during a dynamic process. The phase compensation stage may include 1 to 3 lead correction stages, and each lead correction stage corrects a phase by up to 30° to 40°. Therefore, the lead correction stages can compensate for (offset) a phase lag. The amplification factor K of the amplification part ensures a sufficient voltage amplitude. Therefore, by introducing the PSS into a reactive voltage droop control loop 2, the stability of the system can be improved.

Reference is made to FIG. 1. In FIG. 1, the PSS may include a high-pass filter $$\frac{T_1 \cdot s}{T_1 \cdot s + 1},$$

a phase compensator $$\frac{aT_2 \cdot s + 1}{T_2 \cdot s + 1}$$

and an amplifier K. The high-pass filter may serve as the reset stage of the PSS to filter out the DC component in Δω. The phase compensator may serve as the lead correction stage of the PSS, which can improve a phase margin at a point of oscillation risk. The amplifier may serve as a proportional stage of the PSS to improve a positive damping effect.

Although FIG. 1 and FIG. 3 show that the PSS includes the reset stage, the phase compensation stage, and the amplification stage, the PSS of the present disclosure may include at least one of the reset stage, the phase compensation stage, or the amplification stage.

The first disturbance quantity of the AC bus voltage may be determined by performing, on the virtual angular frequency deviation, at least one of a reset processing, an amplification processing or a phase compensation processing. Reference is made to FIG. 1. For example, the first disturbance quantity $\Delta U_1$ is obtained by performing the reset processing, the amplification processing and the phase compensation processing on the virtual angular frequency deviation Δω. Here, in calculating the first disturbance quantity $\Delta U_1$, the reset processing, the amplification processing and the phase compensation processing may be performed on the virtual angular frequency deviation in a sequence as shown in FIG. 2 or in any other sequence, so as to obtain the first disturbance quantity $\Delta U_1$.

In addition, referring to FIG. 2, the deviation between the reactive power setpoint $Q_0$ and the measured reactive power Q may be multiplied by the reactive droop coefficient $K_Q$, to obtain the second disturbance quantity $\Delta U_2$ of the AC bus voltage. Then, the rated voltage amplitude $U_0$ of the grid, the first disturbance quantity $\Delta U_1$ of the AC bus voltage, and the second disturbance quantity $\Delta U_1$ of the AC bus voltage may be summed up, and then the d-axis virtual impedance output is subtracted from the sum to obtain the d-axis component $U_{qv}*$ of the grid-connected reference voltage in the dq coordinate system. The q-axis virtual impedance output may be subtracted from a q-axis voltage setpoint $U_q*$ at the point of common coupling to obtain the q-axis component $U_{qv}*$ of the grid-connected reference voltage in the dq coordinate system. In an embodiment of the present disclosure, the q-axis voltage setpoint $U_q*$ at the point of common coupling may be set to 0, so that the dq coordinate system is oriented based on the grid voltage.

According to an embodiment of the present disclosure, a voltage outer-loop control, or both the voltage outer-loop control and a current inner-loop control, may be performed on the d-axis component and the q-axis component of the grid-connected reference voltage in the dq coordinate system, to obtain the d-axis component and the q-axis component of the modulated voltage.

For example, referring to FIG. 2, the d-axis component $U_{dv}*$ and the q-axis component $U_{qv}*$ of the grid-connected reference voltage in the dq coordinate system may be inputted to a voltage outer-loop control module 201. In addition, a grid-connected voltage $u_{dq}$ in the dq coordinate system and a grid-connected current $i_{gdq}$ in the dq coordinate system may be inputted to the voltage outer-loop control module 201. The voltage outer-loop control module 201 may perform a voltage outer-loop control on the d-axis component $U_{dv}*$ and the q-axis component $U_{qv}*$ of the grid-connected reference voltage in the dq coordinate system to obtain a d-axis reference filter inductor current $i_d*$ and a q-axis reference filter inductor current $i_q*$. The d-axis reference filter inductor current $i_d*$ and the q-axis reference filter inductor current $i_q*$ may be inputted to a current inner-loop control module 202. In addition, the grid-connected voltage $u_{dq}$ in the dq coordinate system and a filter inductor current $i_{dq}$ in the dq coordinate system may be inputted to the current inner-loop control module 202. The current inner-loop control module 202 may perform a current inner-loop control on the d-axis reference filter inductor current $i_d*$ and the q-axis reference filter inductor current $i_q*$ to obtain the d-axis component $u_{md}$ and the q-axis component $u_{mq}$ of the modulated voltage.

In an embodiment of the present disclosure, a current amplitude limiting module may be disposed between the voltage outer-loop control module 201 and the current inner-loop control module 202, to limit an amplitude of a current output from the voltage outer-loop control module 201.

In addition, with an appropriate modification to the voltage outer-loop control module 201 shown in FIG. 2, the d-axis component and the q-axis component of the modulated voltage may be obtained without performing the current inner-loop control, i.e., by only performing the voltage outer-loop control on the d-axis component and the q-axis component of the grid-connected reference voltage in the dq coordinate system.

Reference is made back to FIG. 1. In step S106, an injection voltage at a point of common coupling of the wind turbine is controlled based on the virtual inner potential phase, the d-axis component of the modulated voltage, and the q-axis component of the modulated voltage.

According to an embodiment of the present disclosure, the d-axis component and the q-axis component of the modulated voltage may be converted, based on the virtual inner potential phase in the dq coordinate system, into a three-phase voltage in an abc coordinate system. For example, referring to FIG. 2, the d-axis component $u_{md}$ and the q-axis component $u_{mq}$ of the modulated voltage may be converted, through a dq/abc conversion module 203, into a three-phase voltage in the abc coordinate system based on the virtual inner potential phase θ in the dq coordinate system. Then, the three-phase voltage in the abc coordinate system is inputted to a SVPWM (Space Vector Pulse Width Modulation) module 204 to perform a space vector pulse width modulation. The three-phase voltage subjected to the space vector pulse width modulation may be inputted to the converter 205, and then used for controlling the injection voltage at the point of common coupling of the wind turbine.

As described above, the modulated voltage in the dq coordinate system and the virtual inner potential phase may be obtained by using the PID controller and the virtual impedance module based on variables, such as the DC bus voltage and the grid-connected current in the dq coordinate system, so as to control the injection voltage at the point of common coupling of the wind turbine. Through the method for controlling a voltage source type wind turbine according to the embodiments of the present disclosure, the injection voltage at the point of common coupling of the voltage source type wind turbine can be controlled stably and effectively, a damping of the system is appropriately improved, and a degree of coupling between active power and reactive power is appropriately reduced. In addition, the PID controller is used to adjust a DC bus voltage deviation, so that the problem of poor frequency adaptability and poor parameter robustness of the wind turbine can be solved. The PSS is adopted so that the system stability of the wind turbine is improved.

In the control system shown in FIG. 2, the control of the virtual impedance module is added to an input end of the voltage outer-loop control. After the voltage outer-loop and the current inner-loop control, a control effect achieved by the converter in a steady state is that a d-axis component and a q-axis component of a voltage at the point of common coupling is equal to a reference d-axis voltage and a reference q-axis voltage of the control system. Due to the mathematical mapping relationship between the stationary abc coordinate system and the rotating dq coordinate system, the virtual impedance added to the reference daxis and q-axis voltages of the control system is equivalent to a virtual impedance connected in series at the point of common coupling of the converter, as shown in FIG. 4.

Figure 4:
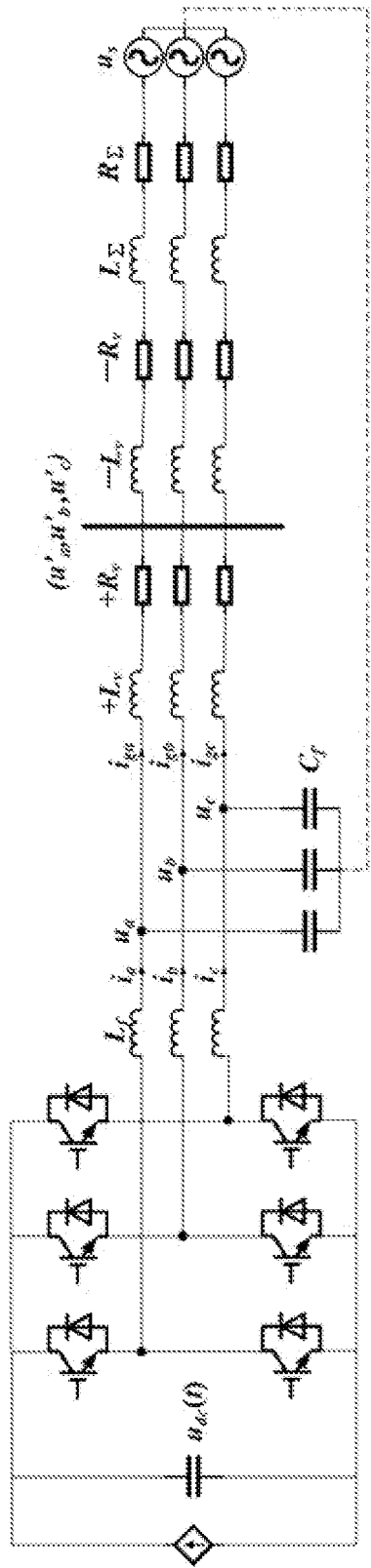
FIG. 4 is an equivalent topological diagram in a stationary abc coordinate system according to an embodiment of the present disclosure.

FIG. 4 is an equivalent topological diagram in a stationary abc coordinate system according to an embodiment of the present disclosure.

In FIG. 4, $u_{dc}(t)$ represents a DC bus voltage changing with time t, and $i_a$, $i_b$ and $i_c$ represent a three-phase current flowing through a filter inductor $L_f$.

Before adding the virtual impedance, the three-phase voltage $u_a$, $u_b$ and $u_c$ on the filter capacitor $C_f$ is controlled. After implementing the aforementioned strategy, the virtual impedance $(R_v+jL_v)$ is introduced in the main circuit. In addition, a voltage control point is no longer the voltage on the filter capacitor, but the three-phase voltage $(u'_a, u'_b, u'_c)$ of the point of common coupling, which may be expressed as E<δ. As can be seen from the FIG. 4, a negative virtual impedance $(-R_v-jL_v)$ is added between $(u'_a, u'_b, u'_c)$ and the system power supply $u_s$. The negative virtual resistance $-R_v$ and the virtual inductance $-L_v$ can offset a resistance $R_Σ$ and an inductance $L_Σ$ of a transmission line, further achieving decoupling between active power and reactive power.

However, in a case that values of the negative virtual resistance $-R_v$ and the virtual inductance $-L_v$ are not appropriately set, a negative damping may be caused in the entire system, resulting in a risk of oscillation. Therefore, in order to improve the system damping, a positive virtual resistance $+R_v$ and virtual inductance $+L_v$ are introduced, and a positive damping of the system is appropriately increased without increasing the degree of coupling between active power and reactive power. In order to introduce the positive virtual resistance $+R_v$ and virtual inductance $+L_v$ between the E<δ and the system power supply $u_s$, signs of the virtual resistance and virtual inductance on the left side and signs of those on the right side of $(u'_a, u'_b, u'_c)$ may be opposite, that is, the negative virtual impedance $(-R_v-jL_v)$ is introduced in the main circuit.

As described above, the stability of the control system can be improved by introducing a positive virtual impedance in the main circuit. In addition, a negative virtual impedance may be introduced in the main circuit in a case that the stability of the control system is sufficient but an impedance of the transmission line is large. In this way, a dynamic performance of the system can be improved by introducing the virtual impedance.

Figure 5:
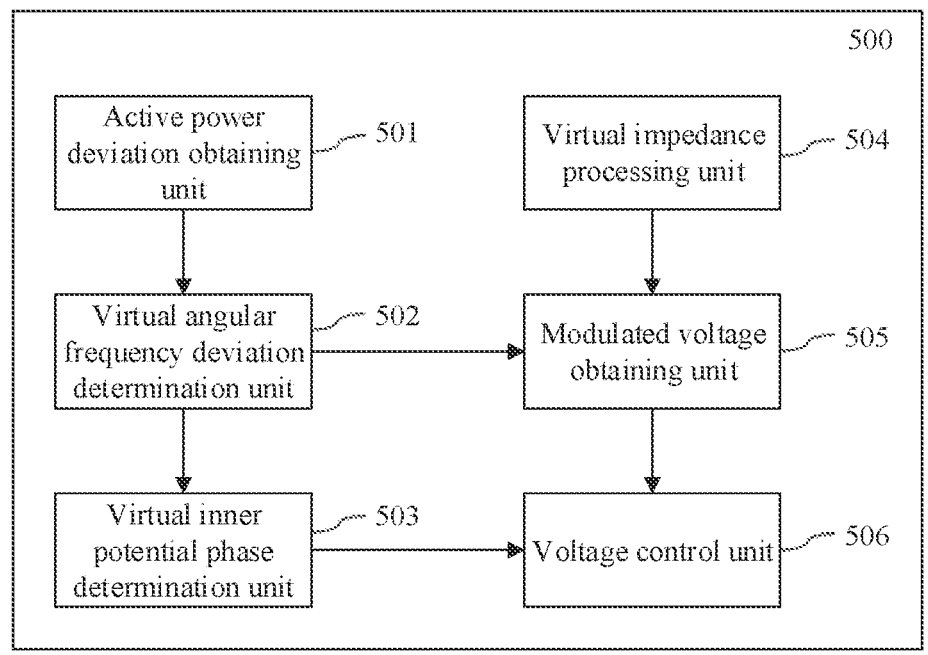
FIG. 5 is a block diagram of an apparatus for controlling a voltage source type wind turbine according to an embodiment of the present disclosure.

FIG. 5 is a block diagram of an apparatus for controlling a voltage source type wind turbine according to an embodiment of the present disclosure. According to an embodiment of the present disclosure, an apparatus 500 for controlling a voltage source type wind turbine may be disposed in a central controller of a wind farm, in a main control of the wind turbine, or in any other computing device that communicates with the wind turbine. In an embodiment of the present disclosure, the computing device 500 may be implemented as a controller of a converter of a voltage source type wind turbine.

The apparatus 500 may include an active power deviation obtaining unit 501, a virtual angular frequency deviation determination unit 502, a virtual inner potential phase determination unit 503, a virtual impedance processing unit 504, a modulated voltage obtaining unit 505, and a voltage control unit 506.

The active power deviation obtaining unit 501 is configured to obtain an active power deviation through a proportional integral differential operation on a deviation between a measured DC bus voltage and a reference DC bus voltage of the wind turbine. Here, the deviation between the measured DC bus voltage and the reference DC bus voltage of the wind turbine may be a difference or squared difference between the measured DC bus voltage and the reference DC bus voltage.

The virtual angular frequency deviation determination unit 502 is configured to determine a virtual angular frequency deviation based on the active power deviation. According to an embodiment of the present disclosure, the virtual angular frequency deviation determination unit 502 may be configured to input the active power deviation directly into a first-order low-pass filter, to obtain an output of the first-order low-pass filter as the virtual angular frequency deviation. Alternatively, the virtual angular frequency deviation determination unit 502 may be configured to input a sum of the active power deviation and a machine-side active power into the first-order low-pass filter, to obtain an output of the first-order low-pass filter as the virtual angular frequency deviation, or input a difference between the active power deviation and a grid-side active power into the first-order low-pass filter, to obtain an output of the first-order low-pass filter as the virtual angular frequency deviation.

The virtual inner potential phase determination unit 503 is configured to determine a virtual inner potential phase based on the virtual angular frequency deviation. According to an embodiment of the present disclosure, the virtual inner potential phase determination unit 503 may be configured to determine a virtual angular frequency based on the virtual angular frequency deviation and a rated angular frequency of the grid, and determine the virtual inner potential phase based on the virtual angular frequency.

The virtual impedance processing unit 504 is configured to input a grid-connected current in a dq coordinate system into a virtual impedance module to obtain a d-axis virtual impedance output and a q-axis virtual impedance output.

The modulated voltage obtaining unit 503 is configured to determine a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output. According to an embodiment of the present disclosure, the modulated voltage obtaining unit 505 may be configured to determine a first disturbance quantity of an AC bus voltage based on the virtual angular frequency deviation, and multiply a deviation between preset reactive power setpoint and the measured reactive power by a reactive droop coefficient to determine a second disturbance quantity of the AC bus voltage. Then, the modulated voltage obtaining unit 505 may be configured to determine a d-axis component of a grid-connected reference voltage in the dq coordinate system based on the first disturbance quantity of the AC bus voltage, the second disturbance quantity of the AC bus voltage, the rated voltage amplitude of the grid, and the d-axis virtual impedance output; and determine a q-axis component of the grid-connected reference voltage in the dq coordinate system based on the q-axis virtual impedance output. Finally, the modulated voltage obtaining unit 505 may be configured to determine the d-axis component and the q-axis component of the modulated voltage based on the d-axis component and the q-axis component of the grid-connected reference voltage in the dq coordinate system.

Here, the modulated voltage obtaining unit 505 may be configured to perform a voltage outer-loop control on the d-axis component and the q-axis component of the grid-connected reference voltage in the dq coordinate system to obtain the d-axis component and the q-axis component of the modulated voltage. Alternatively, the modulated voltage obtaining unit 505 may be configured to perform a voltage outer-loop control on the d-axis component and the q-axis component of the grid-connected reference voltage in the dq coordinate system to obtain the d-axis component and the q-axis component of the modulated voltage. Alternatively, the modulated voltage obtaining unit 505 may be configured to determine the first disturbance quantity of the AC bus voltage by performing, on the virtual angular frequency deviation, at least one of a reset processing, an amplification processing or a phase compensation processing.

The voltage control unit 506 is configured to control an injection voltage at a point of common coupling of the wind turbine, based on the virtual inner potential phase, the d-axis component of the modulated voltage, and the q-axis component of the modulated voltage.

Operations of the units in the apparatus 5 may be understood with reference to the method for controlling a voltage source type wind turbine according to the present disclosure described in FIG. 1 to FIG. 4, and are not repeated here for the sake of brevity.

According to an embodiment of the present disclosure, a computer-readable storage medium storing instructions is further provided. The instructions, when executed by at least one processor, cause the at least one processor to execute the method for controlling a voltage source type wind turbine according to the present disclosure Examples of the computer-readable storage media include: a read-only memory (ROM), a random-access programmable read only memory (PROM), an electrically erasable programmable read only memory (EEPROM), a random-access memory (RAM), a dynamic random-access memory (DRAM), a static random-access memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blue-ray or optical disk storage, a hard disk drive (HDD), a solid state Hard disk (SSD), a card storage (such as multimedia card, secure digital (SD) card or XD card), a magnetic tape, a floppy disk, a magneto-optical data storage device, an optical data storage device, a hard disk, a solid state disk and any other devices configured to store a computer program and any associated data, data files and data structures in a non-transitory manner, and provide the computer program and the associated data, data files and data structures to a processor or computer to enable the processor or computer to execute the computer program. The computer program in the computer-readable storage medium may run in an environment deployed in a computer device such as a client, a host, a proxy device, a server, and the like. In addition, in an example, the computer program and any associated data, data files and data structures are distributed over a networked computer system such that the computer program and the associated data, data files and data structures are stored, accessed and executed in a distributed fashion by one or more processors or computers.

Figure 6:
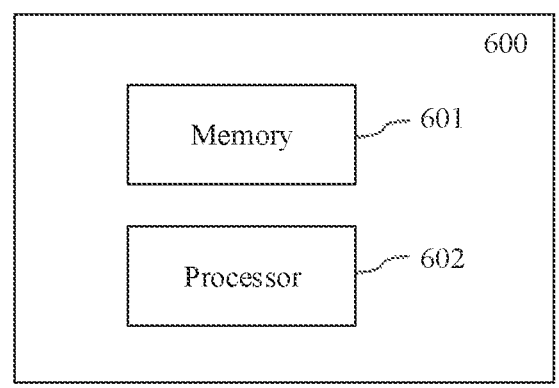
FIG. 6 is a block diagram of a computing device according to an embodiment of the present disclosure.

FIG. 6 is a block diagram of a computing device according to an embodiment of the present disclosure.

Reference is made to FIG. 6. A computing device 600 according to an embodiment of the present disclosure includes a memory 601 and a processor 602. The memory 601 stores a computer program. The computer program, when executed by the processor 602, performs the method for controlling a voltage source type wind turbine according to any of the embodiments of the present disclosure. The computing device 600 may be implemented as a controller of a converter of a voltage source type wind turbine.

In an embodiment of the present disclosure, the computer program, when executed by the processor 602, performs the method for controlling a voltage source type wind turbine as described with reference to FIG. 1 to FIG. 4. The method includes: obtaining an active power deviation through a proportional integral differential operation on a deviation between a measured DC bus voltage and a reference DC bus voltage of the wind turbine; determining a virtual angular frequency deviation based on the active power deviation; determining a virtual inner potential phase based on the virtual angular frequency deviation; inputting a grid-connected current in a dq coordinate system into a virtual impedance module to obtain a d-axis virtual impedance output and a q-axis virtual impedance output; determining a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output; and controlling an injection voltage at a point of common coupling of the wind turbine, based on the virtual inner potential phase, the d-axis component of the modulated voltage, and the q-axis component of the modulated voltage.

The computing device shown in FIG. 6 is only an example, and should not be a limitation to a function and application scope of the embodiments of the present disclosure.

The method and the apparatus for controlling a voltage source type wind turbine, the computer-readable storage medium, and the computing device according to the embodiments of the present disclosure are described above with reference to FIGS. 1 to 6. Nevertheless, it should be understood that the apparatus and units thereof shown in FIG. 5 may be configured as software, hardware, firmware or any combination thereof that perform specific functions. The computing device shown in FIG. 6 is not limited to including the components shown above. Some components may be added or removed as needed, and such components may also be combined with each other.

With the method and apparatus for controlling a voltage source type wind turbine according to the embodiments of the present disclosure, at least one of the following technical effects can be achieved. Various factors, such as the grid stability and the coupling between active power and reactive power are comprehensively considered. The injection voltage at the point of common coupling of the wind turbine is controlled during a dynamic change of a DC bus voltage. Thus, the grid stability and the coupling between active power and reactive power can be improved. For example, the injection voltage at the point of common coupling of the voltage source type wind turbine can be controlled stably and effectively, a damping of the whole system is appropriately improved, and a degree of coupling between active power and reactive power is appropriately reduced. With the proportional integral differential operation on the deviation between a measured DC bus voltage and a reference DC bus voltage of the wind turbine, a frequency adaptability, a parameter robustness and a deviation suppression speed of the wind turbine are improved. By introducing a simulated power system stabilizer (PSS) in the reactive voltage droop control, the power system stability of the wind turbine is improved.

Other embodiments of the present disclosure will be apparent to those skilled in the art from consideration of the specification and practice of the disclosure here. The present disclosure is intended to cover any variation, application, or adapted modification of the present disclosure. Such variation, application, or adapted modification follow the general principles of the present disclosure and include common knowledge or common technical means in the art which are not disclosed in the present disclosure. The description and the embodiments are only illustrative, and the actual scope and spirit of the present disclosure are defined by the claims.

It should be noted that the present disclosure is not limited to the precise structure described above and shown in the drawings. Various modifications and changes may be made without departing from the scope of the present disclosure. The scope of the present disclosure is limited by only the claims.

The invention claimed is:

1. A method for controlling a voltage source type wind turbine, comprising:
    obtaining an active power deviation through a proportional integral differential operation on a deviation between a measured DC bus voltage and a reference DC bus voltage of the wind turbine;
    determining a virtual angular frequency deviation based on the active power deviation;
    determining a virtual inner potential phase based on the virtual angular frequency deviation;
    inputting a grid-connected current in a dq coordinate system into a virtual impedance module, to obtain a d-axis virtual impedance output and a q-axis virtual impedance output;
    determining a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output; and
    controlling an injection voltage at a point of common coupling of the wind turbine, based on the virtual inner potential phase, the d-axis component of the modulated voltage, and the q-axis component of the modulated voltage.

2. The method according to claim 1, wherein the determining a d-axis component of a modulated voltage and a q-axis component of the modulated voltage comprises:
   determining a first disturbance quantity of an AC bus voltage based on the virtual angular frequency deviation;
   multiplying a deviation between the reactive power setpoint and the measured reactive power by a reactive droop coefficient, to determine a second disturbance quantity of the AC bus voltage;
   determining a d-axis component of a grid-connected reference voltage in the dq coordinate system, based on the first disturbance quantity of the AC bus voltage, the second disturbance quantity of the AC bus voltage, the rated voltage amplitude of the grid, and the d-axis virtual impedance output;
   determining, based on the q-axis virtual impedance output, a q-axis component of the grid-connected reference voltage in the dq coordinate system; and
   determining the d-axis component and the q-axis component of the modulated voltage based on the d-axis component and the q-axis component of the grid-connected reference voltage in the dq coordinate system.

3. The method according to claim 2, wherein the determining the d-axis component and the q-axis component of the modulated voltage based on the d-axis component and the q-axis component of the grid-connected reference voltage in the dq coordinate system comprises:
   performing a voltage outer-loop control, or both the voltage outer-loop control and a current inner-loop control, on the d-axis component and the q-axis component of the grid-connected reference voltage in the dq coordinate system, to obtain the d-axis component and the q-axis component of the modulated voltage.

4. The method according to claim 2, wherein the determining a first disturbance quantity of an AC bus voltage based on the virtual angular frequency deviation comprises:
   determining the first disturbance quantity of the AC bus voltage by performing, on the virtual angular frequency deviation, at least one of a reset processing, an amplification processing or a phase compensation processing.

5. The method according to claim 1, wherein the determining a virtual angular frequency deviation based on the active power deviation comprises:
   inputting the active power deviation directly into a first-order low-pass filter, to obtain an output of the first-order low-pass filter as the virtual angular frequency deviation; or
   inputting a sum of the active power deviation and a machine-side active power into the first-order low-pass filter, to obtain an output of the first-order low-pass filter as the virtual angular frequency deviation; or
   inputting a difference between the active power deviation and a grid-side active power into the first-order low-pass filter, to obtain an output of the first-order low-pass filter as the virtual angular frequency deviation.

6. The method according to claim 1, wherein the determining a virtual inner potential phase based on the virtual angular frequency deviation comprises:
   determining a virtual angular frequency based on the virtual angular frequency deviation and a rated angular frequency of the grid; and
   determining the virtual inner potential phase based on the virtual angular frequency.

7. An apparatus for controlling a voltage source type wind turbine, comprising:
   an active power deviation obtaining unit, configured to obtain an active power deviation through a proportional integral differential operation on a deviation between a measured DC bus voltage and a reference DC bus voltage of the wind turbine;
   a virtual angular frequency deviation determination unit, configured to determine a virtual angular frequency deviation based on the active power deviation;
   a virtual inner potential phase determination unit, configured to determine a virtual inner potential phase based on the virtual angular frequency deviation;
   a virtual impedance processing unit, configured to input a grid-connected current in a dq coordinate system into a virtual impedance module, to obtain a d-axis virtual impedance output and a q-axis virtual impedance output;
   a modulated voltage obtaining unit, configured to determine a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output; and
   a voltage control unit, configured to control an injection voltage at a point of common coupling of the wind turbine, based on the virtual inner potential phase, the d-axis component of the modulated voltage, and the q-axis component of the modulated voltage.

8. The apparatus according to claim 7, wherein the modulated voltage obtaining unit is configured to:
   determine a first disturbance quantity of an AC bus voltage based on the virtual angular frequency deviation;
   multiply a deviation between the reactive power setpoint and the measured reactive power by a reactive droop coefficient, to determine a second disturbance quantity of the AC bus voltage;
   determine a d-axis component of a grid-connected reference voltage in the dq coordinate system, based on the first disturbance quantity of the AC bus voltage, the second disturbance quantity of the AC bus voltage, the rated voltage amplitude of the grid, and the d-axis virtual impedance output;
   determine, based on the q-axis virtual impedance output, a q-axis component of the grid-connected reference voltage in the dq coordinate system; and
   determine the d-axis component and the q-axis component of the modulated voltage based on the d-axis component and the q-axis component of the grid-connected reference voltage in the dq coordinate system.

9. The apparatus according to claim 8, wherein the modulated voltage obtaining unit is further configured to:
   perform a voltage outer-loop control on the d-axis component and the q-axis component of the grid-connected reference voltage in the dq coordinate system, to obtain the d-axis component and the q-axis component of the modulated voltage; or
   perform both the voltage outer-loop control and a current inner-loop control on the d-axis component and the q-axis component of the grid-connected reference voltage in the dq coordinate system, to obtain the d-axis component and the q-axis component of the modulated voltage; or determine the first disturbance quantity of the AC bus voltage by performing, on the virtual angular frequency deviation, at least one of a reset processing, an amplification processing or a phase compensation processing.

10. The apparatus according to claim 8, wherein the apparatus is a controller of a converter of the voltage source type wind turbine.

11. The apparatus according to claim 7, wherein the virtual angular frequency deviation determination unit is configured to:

input the active power deviation directly into a first-order low-pass filter, to obtain an output of the first-order low-pass filter as the virtual angular frequency deviation; or input a sum of the active power deviation and a machine-side active power into the first-order low-pass filter, to obtain an output of the first-order low-pass filter as the virtual angular frequency deviation; or input a difference between the active power deviation and a grid-side active power into the first-order low-pass filter, to obtain an output of the first-order low-pass filter as the virtual angular frequency deviation.

12. The apparatus according to claim 7, wherein the virtual inner potential phase determination unit is configured to:

determine a virtual angular frequency based on the virtual angular frequency deviation and a rated angular frequency of the grid; and determine the virtual inner potential phase based on the virtual angular frequency.

13. The apparatus according to claim 7, wherein the apparatus is a controller of a converter of the voltage source type wind turbine.

14. A computing device, comprising:
a processor; and
a memory storing a computer program, wherein the computer program, when executed by the processor, causes the processor to:
obtain an active power deviation through a proportional integral differential operation on a deviation between a measured DC bus voltage and a reference DC bus voltage of a wind turbine;
determine a virtual angular frequency deviation based on the active power deviation;
determine a virtual inner potential phase based on the virtual angular frequency deviation;
input a grid-connected current in a dq coordinate system into a virtual impedance module, to obtain a d-axis virtual impedance output and a q-axis virtual impedance output;
determine a d-axis component of a modulated voltage and a q-axis component of the modulated voltage, based on the virtual angular frequency deviation, a reactive power setpoint and a measured reactive power of the wind turbine, a rated voltage amplitude of a grid, the d-axis virtual impedance output and the q-axis virtual impedance output; and
control an injection voltage at a point of common coupling of the wind turbine, based on the virtual inner potential phase, the d-axis component of the modulated voltage, and the g-axis component of the modulated voltage.

15. The computing device according to claim 14, wherein the computing device is a controller of a converter of a voltage source type wind turbine.

16. The computing device according to claim 14, wherein the computer program causes the processor to:
determine a first disturbance quantity of an AC bus voltage based on the virtual angular frequency deviation;
multiply a deviation between the reactive power setpoint and the measured reactive power by a reactive droop coefficient, to determine a second disturbance quantity of the AC bus voltage;
determine a d-axis component of a grid-connected reference voltage in the dq coordinate system, based on the first disturbance quantity of the AC bus voltage, the second disturbance quantity of the AC bus voltage, the rated voltage amplitude of the grid, and the d-axis virtual impedance output;
determine, based on the q-axis virtual impedance output, a q-axis component of the grid-connected reference voltage in the dq coordinate system; and
determine the d-axis component and the q-axis component of the modulated voltage based on the d-axis component and the q-axis component of the grid-connected reference voltage in the dq coordinate system.

17. The computing device according to claim 16, wherein the computer program causes the processor to:
perform a voltage outer-loop control, or both the voltage outer-loop control and a current inner-loop control, on the d-axis component and the q-axis component of the grid-connected reference voltage in the dq coordinate system, to obtain the d-axis component and the q-axis component of the modulated voltage.

18. The computing device according to claim 16, wherein the computer program causes the processor to:
determine the first disturbance quantity of the AC bus voltage by performing, on the virtual angular frequency deviation, at least one of a reset processing, an amplification processing or a phase compensation processing.

19. The computing device according to claim 14, wherein the computer program causes the processor to:
input the active power deviation directly into a first-order low-pass filter, to obtain an output of the first-order low-pass filter as the virtual angular frequency deviation; or input a sum of the active power deviation and a machine-side active power into the first-order low-pass filter, to obtain an output of the first-order low-pass filter as the virtual angular frequency deviation; or input a difference between the active power deviation and a grid-side active power into the first-order low-pass filter, to obtain an output of the first-order low-pass filter as the virtual angular frequency deviation.

20. The computing device according to claim 14, wherein the computer program causes the processor to:
determine a virtual angular frequency based on the virtual angular frequency deviation and a rated angular frequency of the grid; and
determine the virtual inner potential phase based on the virtual angular frequency.

* * * * *